United States Patent Office 3,090,771
Patented May 21, 1963

3,090,771
CHELATING MONOMERS AND POLYMERS
Gaetano F. D'Alelio, South Bend, Ind., assignor, by direct and mesne assignments, to Dal Mon Research Co., Cleveland, Ohio, a corporation of Delaware
No Drawing. Filed May 12, 1960, Ser. No. 28,559
20 Claims. (Cl. 260—47)

This invention concerns new chelating monomers and polymers and methods for making the new monomers and polymers. Broadly, this invention deals with polymerizable organic compounds having the formula

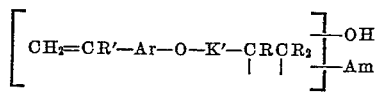

and their polymers containing repeating units of the structure

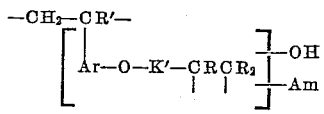

wherein Am is aliphatic aminocarboxyl acid radical bonded through a nitrogen atom, R' represents hydrogen and methyl, R represents hydrogen and lower alkyl radicals of 1 to 6 carbon atoms, K' is a divalent alkylene radical of 1 to 8 carbon atoms in the linear chain between said valencies and preferably represents a total of no more than about 16 carbon atoms, Ar represents a divalent aromatic hydrocarbon radical and the chloro and fluoro derivatives thereof.

Specifically, this invention is directed to the syntheses of these new monomers and to polymerization products obtained by polymerizing a mass comprising these new monomer compounds in the presence or absence of other polymerizable ethylenic compounds. It is a particular object of this invention to prepare soluble and insoluble polymers having in the polymer molecule a plurality of repeating units having the formula also given above. It is a still further object of this invention to prepare new monomeric and polymeric compounds capable of chelating metal ions and to provide a method for making such monomers and polymers.

Heretofore, certain chelating monomers containing a vinyl aryl nucleus have been prepared by reacting a vinylaryl benzyl halide with an aminoacid, and this synthesis is dependent on the expensive and difficulty prepared vinylbenzyl chloride. Another synthesis involves the reaction of chloroacetic acid with vinylbenzyl amine which is synthesized from the vinylbenzyl halide. A third synthesis is even more expensive, involving the use of vinylbenzaldehyde.

I have now discovered that chelating monomers having a vinylaryl nucleus can be prepared from readily available alkenyl aryloxyepoxyalkanes of the formula, $$CH_2=CR'-Ar-O(CHR)_n\underset{O}{\underset{\diagdown\diagup}{CR-CR_2}}$$

e.g. 1-vinylphenoxy-2,3-epoxypropane $$CH_2=CHC_6H_4OCH_2CH\underset{O}{\underset{\diagdown\diagup}{-}}CH_2$$

by the simple reaction with a compound possessing an active hydrogen and having chelating properties, for example, an amino acid, more particularly an imino acid, e.g.,

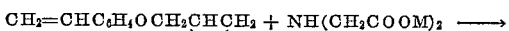
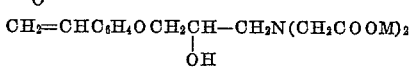

and/or $$CH_2=CHC_6H_4OCH_2CHCH_2OH$$
$$\quad\quad\quad\quad\quad\quad\quad\quad\quad\quad|$$
$$\quad\quad\quad\quad\quad\quad\quad\quad\quad\quad N(CH_2COOM)_2$$

which is generalized as

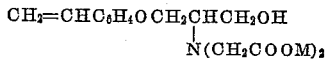

wherein M is a hydrogen, a lower alkyl or aryl group, an ammonium base, or a metal; and that these monomers can be polymerized and copolymerized with each other and with other monomers.

I have discovered further that I can first polymerize or copolymerize the alkenylaryloxyepoxy-alkane to a polymer product having a plurality of repeating units of the formula

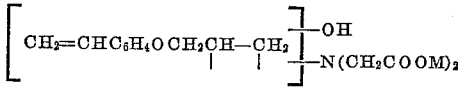

and thereafter react the polymer with a compound possessing an active hydrogen and having chelating properties, for example, an amino acid, thus:

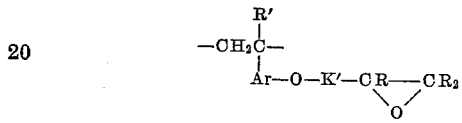

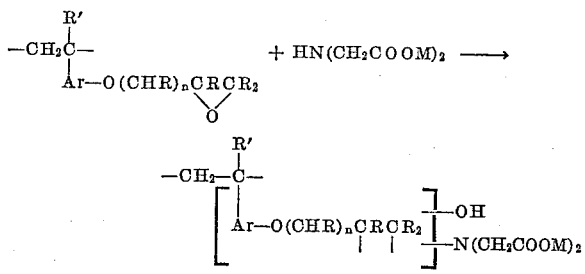

The aliphatic aminocarboxylic acids can be represented by H—Am wherein Am represents an aliphatic aminoacid radical attached to the hydrogen radical through the nitrogen atom.

As is well known, the conventional ion exchange resins are incapable of recovering heavy metal ions from solution containing a higher concentration of alkali- and alkaline-earth ions because such resins function solely by ion-exchange involving electrovalent bonds, and their performance is determined by mass action laws.

It will be noted that the opening of the epoxide linkage results in a hydroxy group which is hydrophilic in character and assists in the wetting of the polymer, especially if it is crosslinked, by aqueous solution of metal cations.

Illustrative aromatic groups represented by Ar include,

—$C_6H_4$—, —$C_6H_3(CH_3)$—, —$C_6H_2(CH_3)_2$—
—$C_6H_3(C_2H_5)$—, —$C_6H_3(Cl)$—, —$C_6H_2(Cl)_2$—
—$C_6H_4$—$C_6H_4$—, —$C_6H_4$—$C_6H_3(Cl)$—
—$C_6H_3(CH_3)$—$C_6H_3(Cl)$—, —$C_6H_3(C_2H_5)$—$C_6H_4$—
—$C_6H_3(Cl)$—$C_6H_3(Cl)$—, —$C_6H_3(F)$—
—$C_6H_2(F)_2$—, —$C_{10}H_6$—, —$C_{10}H_5(Cl)$—
—$C_{10}H_4(Cl)_2$—, —$C_{10}H_5(CH_3)$—, —$C_{10}H_5(C_2H_5)$—
—$C_{10}H_4(CH_3)_2$—, $C_{10}H_5(F)$—, —$C_{10}H_5(F)_2$—, etc.

Illustrative examples of the amino acids, H—Am, which can be reacted with alkenylaryloxyepoxyalkanes are glycine, $NH_2CH_2COOH$; alanine, $CH_3CH(NH_2)COOH$; serine, $HOCH_2CH(NH_2)COOH$; cystene $$HSCH_2CH(NH_2)COOH$$

aminobutyric acid, $CH_3CH_2CH(NH_2)COOH$; threonine $CH_3CH(OH)CH(NH_2)COOH$; valine $$(CH_3)_2CHCH(NH_2)COOH$$

norvaline, CH₃CH₂CH₂CH(NH₂)COOH; isovaline,

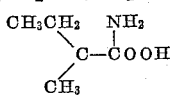

methionine, CH₃SCH₂CH₂CH(NH₂)COOH; neucine, (CH₃)₂CHCH₂CH(NH₂)COOH; norleucine

CH₃CH₂CH₂CH₂CH(NH₂)COOH phenylalanine, C₆H₅CH₂CH(NH₂)COOH; aspartic acid

glutamic acid

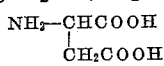

lysine, NH₂(CH₂)₄CH(NH₂)COOH; 1,2-diamino propionic acid

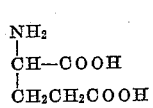

aminopimelic acid, HOOC(CH₂)₄CH(NH₂)COOH; beta-aminovaleric acid, CH₃CH₂CH(NH₂)CH₂COOH; hydroxylysine

NH₂CH₂CH(OH)CH₂CH₂CH(NH₂)COOH hydroxyethylglycine, HOCH₂CH₂NHCH₂COOH; aminoethylglycine, NH₂CH₂CH₂NHCH₂COOH; iminoacetic acid, NH(CH₂COOH)₂; iminopropionic acid

NH(CH₂CH₂COOH)₂ aminoethyliminoacetic acid

NH₂CH₂CH₂N(CH₂COOH)₂ aminopropyliminoacetic acid

NH₂(CH₂)₃N(CH₂COOH)₂ etc., and the derivatives thereof wherein the hydrogen atoms of the carboxylic groups are replaced by lower alkyl and aryl groups, ammonium bases, and metals.

Because of economic reasons the above aminocarboxylic compounds, H—Am, are preferred but there can be used also 3-aminotyrosine, canavanine, citrulline, creatine, creatinine, cysteic acid, cystine, dibromothyronine, 3,5-dibromotyrozine, 3,4-dihydroxyphenylalanine, ethionine, ethionine sulfone, glycocyanine, histidine, homocystine, hydroxyproline, methylhistidine, pennicillamine, pyroglytamic acid, thienylalanine, carboxymethyl aspartic acid

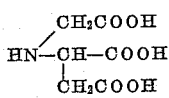

etc., to give the polymerizable monomers of this invention. Instead of the free acid, or the ammonium bases, or the metal bases, the lower alkyl or aryl esters of the aforementioned amino acids also can be used and the reaction product hydrolyzed to obtain the acid.

Instead of reacting the monomric alkenylaryloxyepoxyalkanes with an amino acid, I can first polymerize the alkenylaryloxyepoxyalkanes by vinyl (double bond) polymerization and react the polymer with the amino acid. In either case, when either the monomer or polymer is reacted with the amino acid and the resulting product has an amino group still possessing unsubstituted hydrogen or hydrogens, such compounds can react further with chloroacetic acid or with glycolic nitrile, HOCH₂CN (or its equivalent, an aldehyde and hydrogen cyanide), to introduce further —CH₂COOM groups in the compound.

As is well known the oxirane ring is opened readily by amines and acids and this behaviour offers alternate, though not the preferred, syntheses for the monomers and polymers of this invention. For example, an alkenylaryloxyepoxyalkane reacts readily with HCl to give a chlorohydrin which in the presence of alkali reacts with the aforementioned amino acids to give the monomers of this invention; and the corresponding vinyl polymer behaves in the same manner, thus,

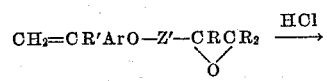

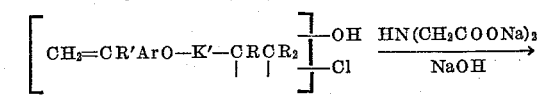

and

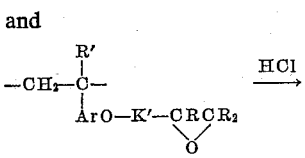

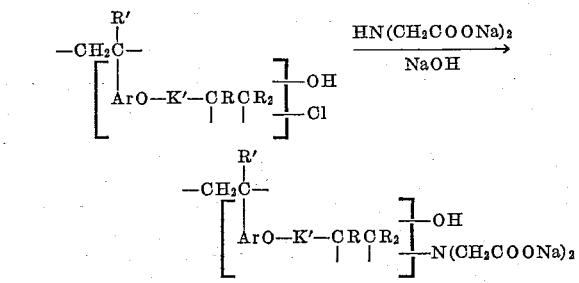

Or, the alkenylaryloxyepoxyalkane can be reacted first with ammonia or a primary amine to give a substituted alkanolamine and thereafter converted to an amino acid in the normal manner with a haloacetic acid or with a mixture of an aldehyde and an inorganic cyanide, thus

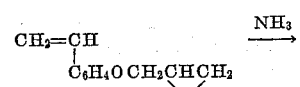

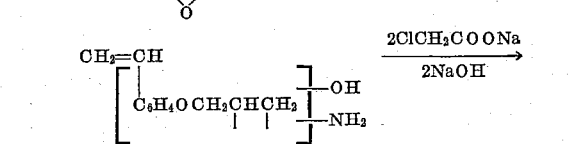

and the corresponding polymer behaves in a similar manner, e.g.,

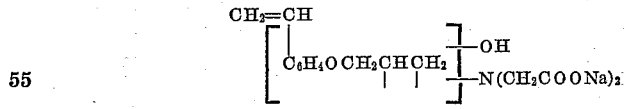

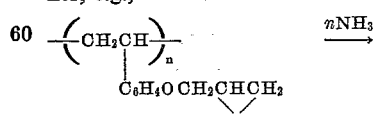

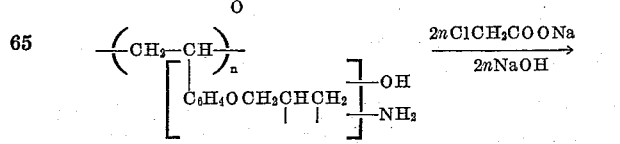

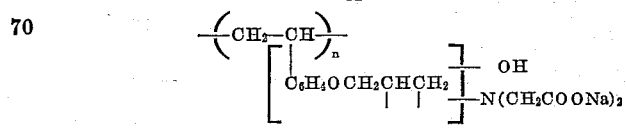

Because of costs and other economic factors, I prefer for the practice of this invention, compounds of the formula

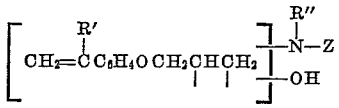

wherein Z represents a radical selected from the group of

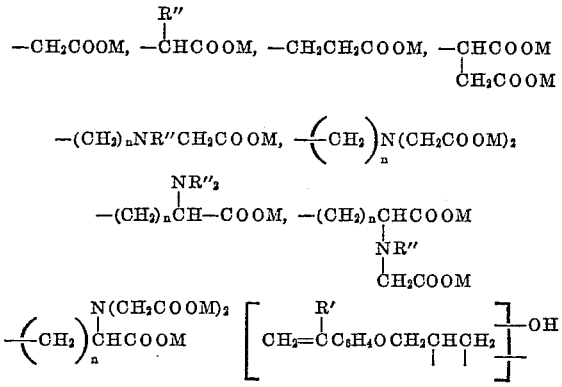

wherein M is a member of the group consisting of hydrogen, lower alkyl and aryl groups, ammonium bases, and metals, $n$ is an integer of 1 to 10, R' represents hydrogen and methyl, and R'' represents a radical selected from the class of hydrogen, lower alkyl radicals, lower hydroxyalkyl radicals, lower mercaptoalkyl radicals, lower aryl radicals, and —K—COOM.

Some of the compounds of this invention can be represented also by the following formula:

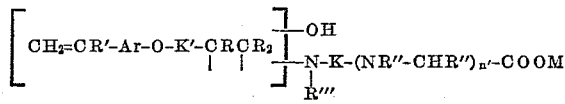

wherein the symbols Ar, K', R, R', R'', and M are as defined above; $n'$ is 0 or 1; R''' is a group represented by R'' and can also be

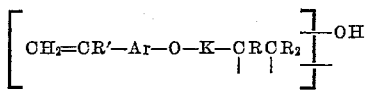

and K is a divalent alkylene group preferably having no more than about 10 carbon atoms in the chain connecting said valencies.

It is preferred that, when $n'$ is 0, either K represents a methylene or ethylene group or there is an NR''$_2$ group substituted on a carbon atom of K no farther removed than two carbon atoms from said COOM group. The alkylene radical K can have substituted thereon various substituent groups, such as —OH, —NR$_2$, —SH, lower alkyl-S— groups, and lower aryl groups, as well as additional —COOM groups. The simpler compounds are preferred, generally those derived from amino acids having no more than about 20 carbon atoms therein, preferably no more than about 10 carbon atoms, and advantageously having no more than about two groups selected from the class consisting of hydroxy and thio groups. Also, it is generally not any particular advantage to have more than six groups in the amino acid selected from the class consisting of amino and —COOM groups.

As used herein, the terms "lower alkyl," "lower hydroxyalkyl," "lower mercaptoalkyl," and "lower aryl" are intended to include such groups having no more than about 10 carbon atoms, such as methyl, ethyl, propyl, isopropyl, butyl, secondary butyl, amyl, secondary amyl, hexyl, heptyl, nonyl, decyl, secondary hexyl, secondary nonyl, benzyl, phenethyl, hydroxyethyl, hydroxypropyl, hydroxybutyl, hydroxyamyl, mercaptoethyl, mercaptomethyl, mercaptopropyl, mercaptoamyl, methylmercaptomethyl, methylmercaptoethyl, ethylmercaptomethyl, ethylmercaptoethyl, ethylmercaptopropyl, phenyl, tolyl, dimethylphenyl, naphthyl, ethylphenyl, propylphenyl, butylphenyl, etc. groups.

The ammonium bases defined herein for M include the ammonium radical and various substituted ammonium radicals having various substituents thereon, such as alkyl groups, aryl groups, hydroxyalkyl groups, etc., preferably those having no more than about 21 carbon atoms, advantageously those having no more than about 10 carbon atoms. Typical examples of such substituted ammonium radicals include those derived from ammonia, methyl amine, dimethyl amine, trimethyl amine, ethyl amine, diethyl amine, triethyl amine, propyl amine, butyl amine, dibutyl amine, tributyl amine, trihexyl amine, triheptyl amine, ethanol amine, diethanol amine, triethanol amine, isopropanol amine, diisopropanol amine, triisopropanol amine, methyl diethanol amine, dimethyl ethanol amine, morpholine, dimethyl benzyl amine, pyridine, ethyl pyridine, quinoline, isoquinoline amino pyridine, guanidine, biguanidine, aniline, methyl aniline, dimethyl aniline, phenylene diamine, piperazine, triethylene diimine

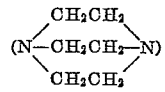

hydrazine, methyl hydrazine, symmetrical dimethyl hydrazine, phenyl hydrazine, amino imidazole, amino diazines, hydrazino triazines, etc.

Typical metals that can be used in substitution for M in the formulas given herein, include lithium, sodium, potassium, rubidium, cesium, calcium, strontium, barium, and the chelate-forming metals as disclosed in "Chemistry of Metal Chelates," by Martell and Calvin, published by Prentice-Hall (1956). Page 182 of this book shows the periodic classification of chelate-forming metals.

The monomers of this invention can be polymerized individually or as mixtures with each other, or with 0.1, preferably 1 percent by weight or more of other vinyl and vinylidene compounds, such as styrene, alphamethyl styrene, vinyl toluene, vinyl xylene, chlorostyrene, butadiene, isoprene, acrylonitrile, methacrylonitrile, methacrylate, ethylacrylate, benzylacrylate, methyl methacrylate, ethyl methacrylate, glycol diacrylate, glycol dimethacrylate, allyl acrylate, allylmethacrylate, vinyl acetate, vinyl propionate, diallyl succinate, diallyl phthalate, maleic anhydride, dimethyl maleate, itaconic anhydride, itaconic imide, dimethyl itaconate, diallyl itaconate, acrylamide, methacrylamide, allylacrylamide, hydroxyethylacrylamide, N-methylene-bis-acrylamide, acetylglycine, vinyl pyridine, methacrylyllysine, methylvinylketone, acetylaminophenylethylene, vinylimidazole, 2-isopropenyl-4-isopropyl-2-oxazolin-5-one, N-vinyl-5-methyl-2-oxazolidinone, N-vinyl-pyrrolidone-2, etc., or they can be grafted to other polymers containing peroxy groups to produce grafted copolymers, as disclosed in my copending application, Serial No. 28,560, filed the same date herewith.

The polymers and copolymers of this invention can be prepared in mass, in solution, in suspension, and emulsion systems, using the accepted initiating systems, such as the per compounds that generate radicals, or thermally, or with ultraviolet light, or with ionizing radiation, and in some cases, with ionic catalysts, both cationic and anionic, e.g., BF$_3$, sodamide, HF, etc.

The invention is illustrated by the following examples which are intended merely for illustration and are not in any way to be interpreted as limiting the manner in which the invention can be practiced. All parts and percentages are given by weight unless otherwise specified.

EXAMPLE I

To a mixture of 1000 parts of water, 1500 parts CH$_3$OH, 81 parts NaOH in 500 parts water and 133 parts of iminodiacetic acid in a suitable reaction flask equipped with a stirrer and heating means, there is added slowly at 35° C. over a period of two hours, 176 parts of 1-(4- vinylphenoxy)-2,3-epoxypropane, following which the mixture is refluxed for ½ hour. The methanol then is distilled from the reaction mixture and 10 parts of decolorizing carbon stirred into the reaction mixture and the mixture filtered. The cooled, filtered mixture is acidified with concentrated hydrochloric acid to a pH of 2–3 and the white crystalline precipitate collected by filtration, dried, and there is obtained a monomer corresponding to the formula

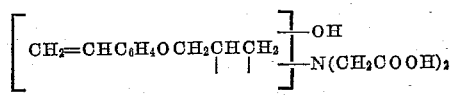

which, an elemental analysis, gives C, 58.20%; H, 6.21%; N, 4.48%, which values are in close agreement with the theoretical.

Reaction with bromine confirms the presence of olefin unsaturation.

The monomer of this example is characterized further by its ability to chelate metal ions in solution. The metal chelates are prepared by dispersing the sodium or ammonium derivative of monomer compound in water, or in an N KCl or NaCl solution and adding the metal ion in the form of a salt, such as the nitrate, chloride, sulfate, etc., e.g. $CuCl_2$ $FeCl_2$, $FeCl_3$, etc.; or the acidic monomer compound can be used directly by dispersing it in the solution of the metal ions and adding alkaline substances, such as NaOH, KOH, LiOH, $NH_3$, $CH_3NH_2$, $(CH_3)_2NH$, $(CH_3)_3N$, $N(CH_2CH_2OH)_3$, etc. The monomer of this example forms 1:1, and 2:1 chelates with $Cu^{++}$, $Co^{++}$, $Ni^{++}$, $Fe^{+++}$, $Fe^{++}$, $Pb^{++}$, as well as a 1:1 chelate with $Mn^{++}$.

EXAMPLE II

The procedure of Example I is repeated using 117 parts of isovaline and 41 parts of NaOH instead of the iminodiacetic acid and 81 parts NaOH. There is obtained a monomer corresponding to the formula

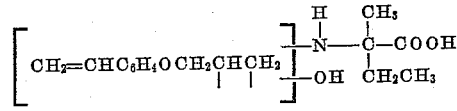

which on analysis gives C, 65.89%; H, 7.22%; N, 4.78%, which values are in close agreement with the theoretical.

EXAMPLE III

When 117 parts of valine are used in the procedure of Example II instead of isovaline, there is obtained a monomer corresponding to the formula,

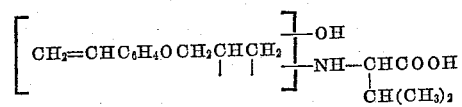

which on elemental analysis gives values of C, 65.9%; H, 7.19%; N, 4.74%, which are in good agreement with the theoretical values.

EXAMPLE IV

When 117 parts of norvaline are used in the procedure of Example II instead of isovaline, there is obtained a monomer corresponding to the formula,

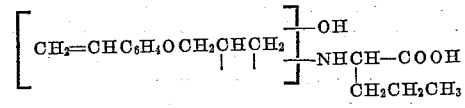

which on elemental analysis gives values for C, H, and N in close agreement with the values of Example III.

EXAMPLE V

When the procedure of Example II is repeated using an equivalent amount of (*a*) 75 parts glycine, (*b*) 89 parts alanine, (*c*) 103 parts aminobutyric acid, (*d*) 165 parts leucine, and (*e*) 151 parts phenyl glycine, respectively, in place of the isovaline, there is obtained respectively, monomers corresponding to the formulas

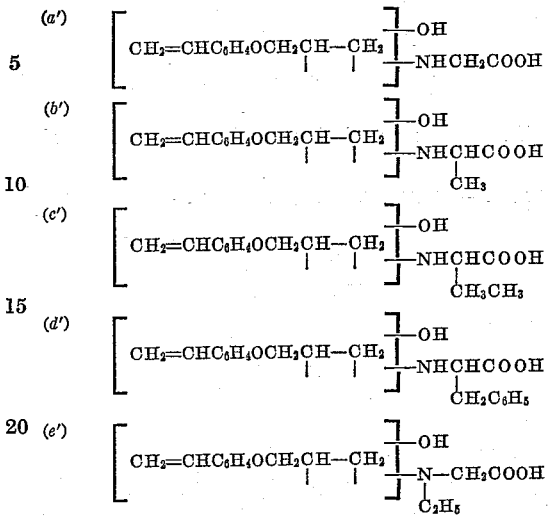

which on analyses give values for C, H, and N in close agreement with the theoretical values for these compounds, and which have good chelating properties for metal ions.

EXAMPLE VI

The procedure of Example I is repeated using 133 parts of aspartic acid instead of iminodiacetic acid and there is obtained a monomer corresponding to the formula

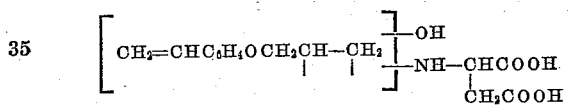

whose chelating properties are similar to the monomer of Example I.

EXAMPLE VII

When 147 parts of glutamic acid are substituted for the aspartic acid of Example VI, there is obtained a monomer corresponding to the formula

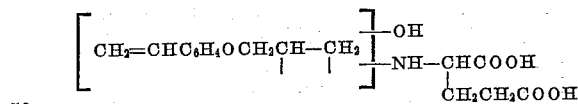

and when 175 parts of aminopimelic acid are used instead of the aspartic acid of Example VI, there is obtained a monomer corresponding to the formula

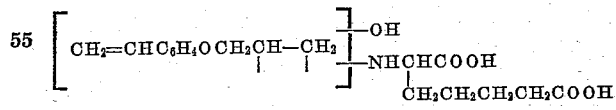

which has marked chelating properties for metal ions.

EXAMPLE VIII 146 parts of 1-(4-vinylphenoxy)-2,3-epoxypropane are reacted with 149 parts of methionine and 41 parts NaOH in a water-methanol solution according to the procedure of Example I and there is obtained a monomer corresponding to the formula

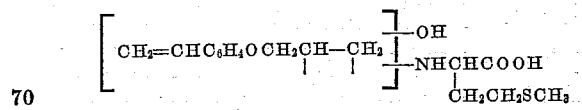

EXAMPLE IX

When the procedure of Example VIII is repeated using 119 parts of hydroxyethyl glycine instead of methionine, there is obtained a monomer corresponding to the formula

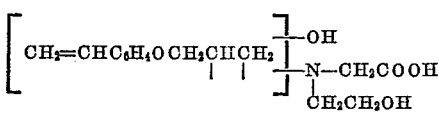

EXAMPLE X

When the procedure of Example VIII is repeated using 104 parts of serine instead of methionine there is obtained a compound corresponding to the formula

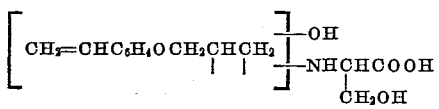

EXAMPLE XI

When the procedure of Example I is repeated using 121 parts of cystene instead of iminoacetic acid there is obtained a compound corresponding to the formula

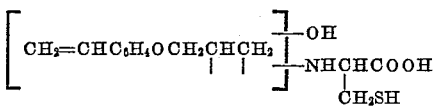

EXAMPLE XII

The procedure of Example I is repeated using 292 parts of divinylbenzene-monoepoxide, 75 parts of glycine, and 41 parts of NaOH and there is obtained a monomer corresponding to the compound (a)

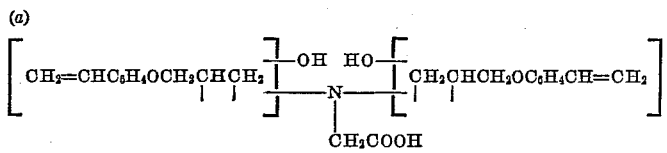

which functions as a crosslinking agent as well as a chelating compound. By using the corresponding aminoacids, the following monomers are made in a similar manner.

(b)

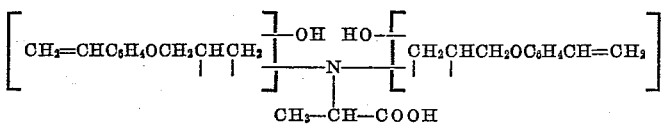

(c)

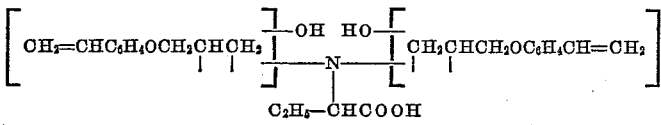

(d)

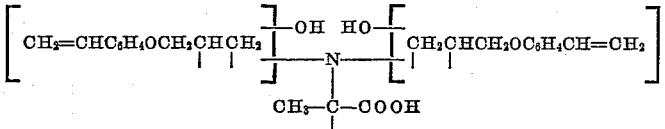

(e)

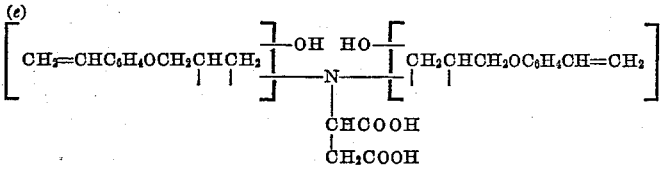

When evaluated by the procedure of Example I, the monomers of Examples II and XII inclusive are shown to form metal chelates with heavy metal ions in solution.

EXAMPLE XIII 181.5 parts of vinylphenoxyglycerylchlorohydrin,

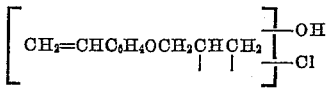

(obtained by reacting one mole of 1-vinylphenoxy-2,3-epoxypropane with one mole of concentrated HCl solution) are added slowly over a period of 90 minutes to a refluxing stirred mixture in a suitable reactor of 133 parts of iminodiacetic acid, 81 parts of NaOH, 1000 parts of water and 2000 parts of methanol. After half of the chlorohydrin has been added, another 40 parts of NaOH in 150 parts of water is added, and the addition of the chlorohydrin continued until completed, following which the mixture is allowed to cool to room temperature. The mixture is then extracted with four separate portions of 30 parts of chloroform. The mixture then is acidified with concentrated hydrochloric acid to a pH of 2–2.5 and the crystalline solid separated by filtration and recrystallized from water. There is obtained a monomer corresponding to the formula of the monomer of Example XII.

EXAMPLE XIV 163 parts of

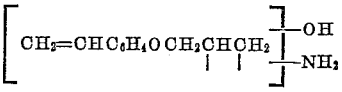

(obtained by treating 1-vinylphenoxy-2,3-epoxypropane with ammonia), 144 parts of dimethyl maleate and 300 parts of ethyl ether are mixed and stirred for 150 hours at room temperature, followed by the addition of 50 parts of concentrated hydrochloric acid. The ether layer is separated, dried with anhydrous sodium sulfate and refiltered. Evaporation of the ether yields the ester,

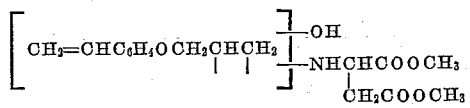

which can be used directly as a monomer and thereafter saponified, or it can be saponified directly. 150 parts of this ester is refluxed with 300 parts of water containing 60 parts NaOH for 4 hours, following which it is acidified to a pH of 2.5 with concentrated hydrochloric acid and on cooling, the precipitated monomer is filtered and dried. There is obtained a monomer corresponding to the formula of the monomer of Example VI,

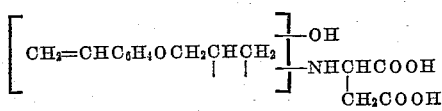

EXAMPLE XV

To a solution containing 120 parts of chloroacetic acid, 100 parts of NaOH, 1000 parts of water is added 163 parts of

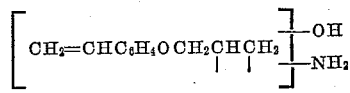

and the mixture heated at 80–90° C. for 30–45 minutes. A small amount of decolorizing carbon is added and the solution is filtered, then acidified with concentrated hydrochloric acid to a pH of 1.9–2.2, followed by concentrating the solution to 60–70% of its original volume under reduced pressure. The slurry is filtered and the crystals dried. There is obtained a monomer corresponding to the monomer of Example I.

EXAMPLE XVI

The monomer of Example XV can be prepared also by reacting the substituted ethanolamine in the presence of alkali with glycolonitrile (or its equivalent formaldehyde and an alkali cyanide) as follows: a mixture of 163 parts of

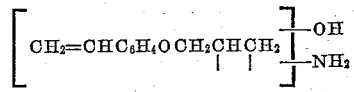

1000 parts of water, 80 parts of NaOH in a suitable container is heated to 70–80° C. and 82 parts of 70% aqueous solution of glycolonitrile is added slowly over a 3–4 hour period. After all of the ammonia has been expelled, the solution is concentrated to 60–70% of its original volume, treated with a little decolorizing carbon, filtered, acidified to a pH of 2–2.5, and the monomer separated by filtration and dried.

EXAMPLE XVII

The procedure of Example I is repeated using 176 parts of aminoethyl-aminoacetic acid instead of the iminoacetic acid and there is obtained a monomer corresponding to the formula

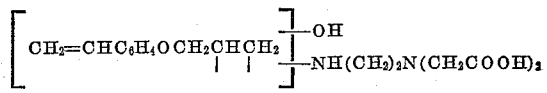

and when this is treated with chloroacetic acid according to the procedure of Example XV, or with glycolonitrile according to the procedure of Example XVI, there is obtained the monomer corresponding to the formula

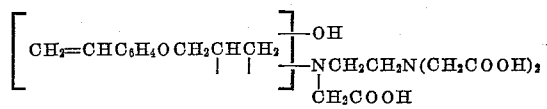

EXAMPLE XVIII

The procedure of Example II is repeated using 154 parts of lysine instead of isovaline, and there is obtained a monomer corresponding to the formula

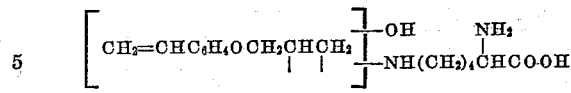

and when the monomer is treated with 3 moles of chloroacetic acid according to the procedure of Example XV, or with 3 moles of glycolonitrile according to the procedure of Example XVI, there is obtained the monomer corresponding to the general formula

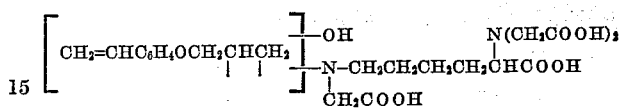

EXAMPLE XIX

Fifty parts of distilled water, 0.5 part of hydroxyapatite (0.005 to 0.2 micron size), 0.01 part of sodium dodecylbenzenesulfonate, 2.5 parts of commercial divinylbenzene (50% DVB) and 45 parts of 1-vinylphenoxy-2,3-epoxypropane, 0.2 part of benzoyl peroxide are mixed in a suitable reaction flask and stirred for 15 hours at 90° C. and there is obtained a crosslinked copolymer having the repeating unit,

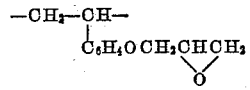

EXAMPLE XX

Fifty parts of distilled water, 0.5 part of hydroxyapatite (0.1 to 0.2 micron), 0.005 part of sodium dodecylbenzenesulphonate, 0.1 part 2,2'-azobisisobutyronitrile and 50 parts of 1-vinylphenoxy-2,3-epoxypropane are mixed in a suitable quantitative yield of a fusible polymer having the repeating unit,

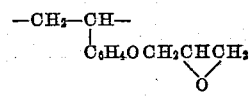

which is soluble in such solvents as acetone, chloroform, etc.

EXAMPLE XXI

To 1000 parts of water is added 25 parts of

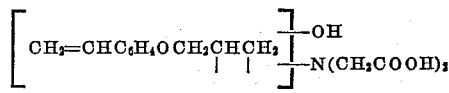

and the solution maintained at 90–92° C. for 4 days while exposed to ultraviolet light. There is obtained a precipitate which corresponds to the polymer having

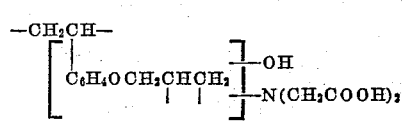

groups.

Using the method of Chaberek and Martell (J. Am. Chem. Soc., 74, 5052 (1952)), the disassociation constants as determined qualitatively are about $k_1 = 4.58 \times 10^{-4}$ and $k_2 = 6.68 \times 10^{-10}$. The polymer turns blue upon the addition of a solution of cupric chloride, leaving the water phase colorless. Using the procedure described by J. Bjerrum ("Metal Amine Formation in Aqueous Solution," Publisher Haase and Son, Copenhagen, 1941) it is determined that the polymer forms both 1:1 and 2:1 chelates, whose stability constants are approximately $K_1 = 5.78 \times 10^9$ and $K_2 = 1.55 \times 10^6$. The polymer also forms chelates with ferric chloride corresponding to 1:1, 1:2, and 1:3 chelates below pH values of 8.6 and the stability constants of these chelates are approximately $K_1 = 1.26 \times 10^{10}$, $K_2 = 4.60 \times 10^7$, and $K_3 = 8.09 \times 10^4$.

EXAMPLE XXII

A mixture of 35 parts of

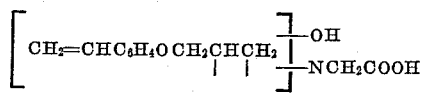

100 parts of water, containing 4 parts NaOH are heated to reflux and 50 mg. of sodium persulfate added and the heating continued at 90° C. for 24 hours, following which is added another 50 mg. of sodium persulfate in 200 parts of water and the heating continued for an additional 24 hours. There is obtained a crosslinked polymer gel which is washed with 2000 parts of water. The washed polymer is then added to 2000 parts of dilute sodium hydroxide and the mixture heated, cooled, filtered, washed with 5000 parts water, and dried. There is obtained a crosslinked polymer having the repeating unit,

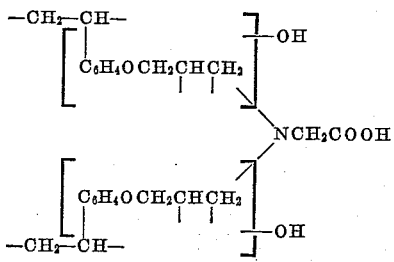

whose chelate stability constants for copper are approximately $K_1 = 2.37 \times 10^5$ and $K_2 = 4.36 \times 10^4$.

EXAMPLE XXIII

A mixture of 25 parts of

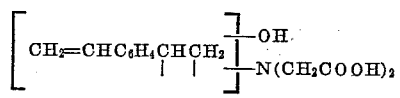

and 10 parts of

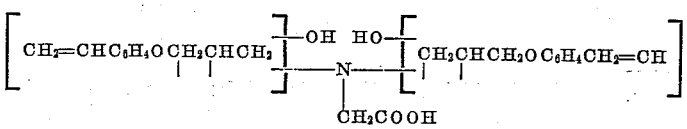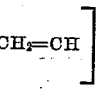

are polymerized by the procedure of Example XXII and there is produced a resinous copolymer which chelates with the metal ions of $Fe^{++}$, $Fe^{+++}$, $Co^{++}$, $Ni^{++}$, $Cu^{++}$, $Pb^{++}$, $Mn^{++}$, $Sr^{++}$, and $Mn^{+++}$.

EXAMPLE XXIV

A mixture of 14 parts of iminodiacetic acid, 15 parts of 1-vinylphenoxy-2,3-epoxypropane polymer of Example XX, and 500 parts of dioxane are stirred at room temperature for 12 hours and 5 parts of tributyl amine added, following which the mixture is heated for 12 hours at 70–80° C. and at the end of that period 2000 parts of water are added slowly. The solid chelating polymer is separated, dried, and has properties similar to the polymer of Example XXI.

EXAMPLE XXV

The procedure of Example XXIV is repeated, using the divinylbenzene-vinylphenoxyepoxypropane copolymer of Example XIX instead of the polymer of Example XX. There is obtained a crosslinked copolymer having chelating properties similar to the polymer of Example XXIII.

EXAMPLE XXVI

The procedure of Example XIX is repeated using divinylbenzene and

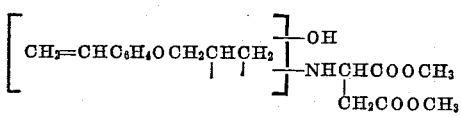

and there is obtained 47.5 parts of a crosslinked polymeric ester which is suspended in 500 parts of 5% sulfuric acid and heated to reflux temperature for 24 hours to hydrolyze the ester groups. There is obtained a chelating polymer having properties similar to that of Example XXV.

EXAMPLE XXVII

A mixture of 28 parts of

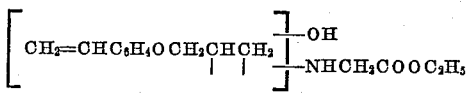

(the ethyl ester of the monomer of Example V($a'$)), 52 parts of styrene (approximately 1:5 mole ratio of monomers), and 0.35 part of benzoyl peroxide in 200 parts of benzene are refluxed for eight hours and there is obtained a copolymer solution which is concentrated under reduced pressure and the polymer washed with methanol. Hydrolysis of the copolymer with sodium hydroxide produces the sodium salt of the copolymer which on acidification with acid produces the copolymer acid. In a similar manner other ratios of the two monomers from 100:1 to 1:100 can be copolymerized. Also, instead of styrene substituted styrenes, such as the methyl styrenes, the dimethyl styrenes, the chlorostyrenes, etc., may be used to produce the corresponding copolymers.

EXAMPLE XXVIII 26 parts of

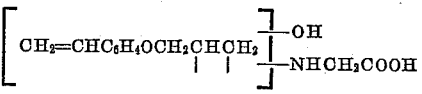

and 8.1 parts of acrylamide are added to 175 parts of water and the pH adjusted to 5.5 with NaOH. To this solution is added 0.4 part of 2,2′-azobisisobutyronitrile and the mixture heated to 70° C. for 10 hours. The resulting copolymer is precipitated with acetone, rewashed with acetone, filtered, and dried, and the isolated copolymer forms good chelates with copper and other chelate-forming metals. Instead of the approximately 1:1 ratio used above other ratios varying from 1:100 to 100:1 can be used to prepare chelating copolymers.

EXAMPLE XXIX 1000 parts of polyethylene granules are irradiated in air at room temperature with a cobalt 60 source to a dose of 15 magareps and then immersed in a 50% mixture of

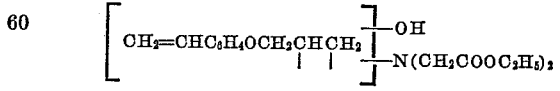

and heptane and heated at 60–70° C. until the increase in weight of the polyethylene is about 25%. The polymer is then hydrolyzed at 80° C. in a 10% NaOH alcohol solution and there is obtained a graft copolymer having chelating properties similar to the polymer of Example I.

EXAMPLE XXX

An aqueous solution of 2-vinyl phenolate is prepared from 120 parts of 2-vinyl phenol, 42 parts sodium hydroxide, and 400 ml. water. This solution is added with stirring over a period of 1 to 1.5 hours to 102.6 parts of epichlorohydrin at 60° C. and stirred for an additional hour at 80–85° C. The resulting solution comprises

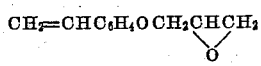

which can be used as such, or the water can be removed by evaporation at reduced pressure. Alternately, the aqueous solution can be extracted with five 200-part portions of ethyl ether; the ether removed by evaporation leaving an oily residue which is distilled at 1 mm. pressure to separate the epoxy compound from a small quantity of 1-(2-vinylphenoxy)-2,3-propanediol. When 3- or 4-vinyl phenol are used instead of 2-vinyl phenol in the above procedure, the corresponding glycidyl ether is obtained. Similarly, when the isopropenyl phenols, or when the vinyl or isopropenyl cresols are used, the corresponding alkenyl aryloxyepoxyalkanes are obtained. When, instead of epichlorohydrin, there is used other haloepoxyalkanes, such as, for example, 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxypentane, 2-chloromethyl-1,2-epoxybutane, 1-bromo-4-methyl-3,4-epoxypentane, 1-bromo-4-ethyl-2,3-epoxypentane, 4-chloro-2-methyl-2,3-epoxypentane, 1-chloro-2,3-epoxypentane, 1-chloro-2,3-epoxyoctane, 1-chloro-2-methyl-2,3-epoxyoctane, 1-iodo-2,3-epoxydecane, etc., then the corresponding alkenylarylepoxyalkane is obtained.

EXAMPLE XXXI

A number of the foregoing procedures are repeated using an equivalent weight of a different epoxy compound in place of that of the original example. The following table lists the original example and the respective epoxy compound used. Table II lists the corresponding resulting products.

Table I

| | Example repeated | Epoxy compound |
|---|---|---|
| (a) | I | 1-(4-isopropenyl-2-Me-phenoxy)-3-4-epoxybutane. |
| (b) | VI | 1-(4-vinylphenoxy)-3,4-epoxybutane. |
| (c) | XVII | 2-(4-vinylphenoxy)-4,5-epoxypentane. |
| (d) | XIV | 2-(4-vinyl-2-Cl-phenoxy)-6,7-epoxyoctane. |
| (e) | I | 1-(4-vinylnaphthoxy)-2,3-epoxypropane. |
| (f) | VI | 1-(vinyl-diphenyloxy)-2,3-epoxypropane. |

Table II (a) 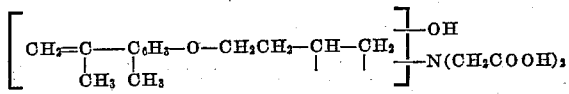

(b) 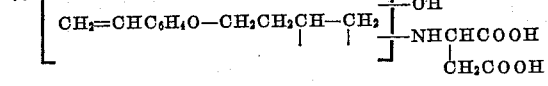

(c) 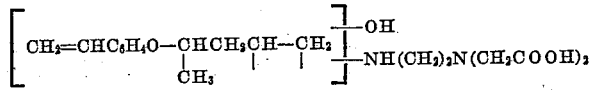

(d) 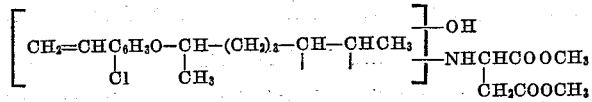

(e) 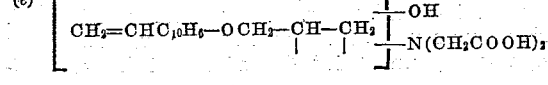

(f) 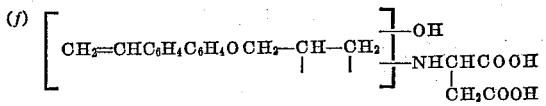

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A compound having the formula

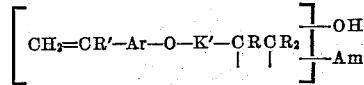

wherein R' is a radical selected from the class consisting of hydrogen and methyl radicals; R is a radical from the class consisting of hydrogen and alkyl radicals of no more than 6 carbon atoms; Ar represents a divalent aromatic radical selected from the class consisting of divalent aromatic hydrocarbon radicals and the chloro, and fluoro derivatives thereof; K' is a divalent alkylene radical of at least 1 and no more than 8 carbon atoms in the linear chain between said valencies; and Am represents an aminoacid radical selected from the class consisting of aliphatic aminoacids, the metal and ammonium salts and lower alkyl and lower aryl esters thereof, said Am radical having the valence bond of said formula attached to an amino nitrogen in said radical, having no more than about 20 carbon atoms therein and having an amino group no farther than 2 carbon atoms away from a carboxylic group.

2. A polymer having a plurality of repeating units of the formula

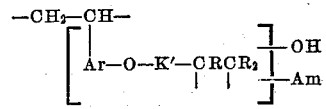

wherein R' is a radical selected from the class consisting of hydrogen and methyl radicals; R is a radical from the class consisting of hydrogen and alkyl radicals of no more than 6 carbon atoms; Ar represents a divalent aromatic radical selected from the class consisting of divalent aromatic hydrocarbon radicals and the chloro, and fluoro derivatives thereof; K' is a divalent alkylene radical of at least 1 and no more than 8 carbon atoms in the linear chain between said valencies; and Am represents an aminoacid radical selected from the class consisting of aliphatic aminoacids, the metal and ammonium salts and lower alkyl and lower aryl esters thereof, said Am radical having the valence bond of said formula attached to an amino nitrogen in said radical, having no more than about 20 carbon atoms therein and having an amino group no farther than 2 carbon atoms away from a carboxylic group.

3. A process of preparing chelating compounds which comprises the step of reacting an aminoacid compound with an alkenylaryloxyepoxyalkane of the formula

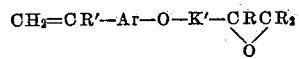

wherein R' is a radical selected from the class consisting of hydrogen and methyl radicals; R is a radical from the class consisting of hydrogen and alkyl radicals of no more than 6 carbon atoms; Ar represents a divalent aromatic radical selected from the class consisting of divalent aromatic hydrocarbon radicals and the chloro, and fluoro derivatives thereof; and K' is a divalent alkylene radical of at least 1 and no more than 8 carbon atoms in the linear chain between said valencies; said aminoacid compound being selected from the class consisting of aminoacids and the metal and ammonium salts and lower alkyl and lower aryl esters thereof, said aminoacids having a hydrogen atom on an amine group therein, having no more than about 20 carbon atoms therein and having an amino group no farther than 2 carbon atoms away from a carboxylic group.

4. A compound having the formula

5. A compound having the formula

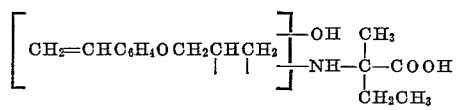

6. A compound having the formula

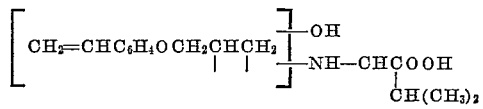

7. A compound having the formula

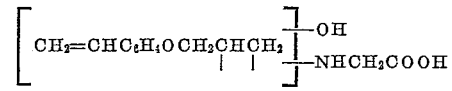

8. A compound having the formula

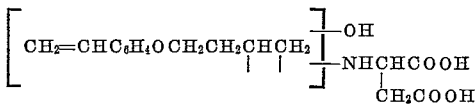

9. A compound having the formula

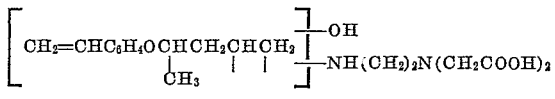

10. A compound having the formula

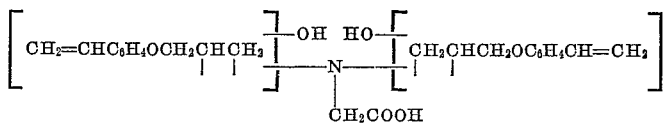

11. A compound having the formula

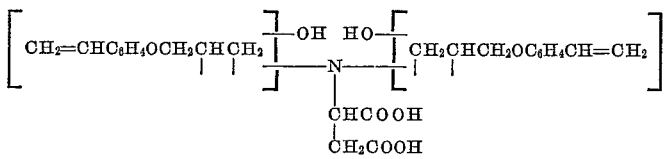

12. A polymer having a plurality of repeating units having the formula

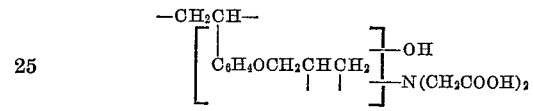

13. A polymer having a plurality of repeating units having the formula

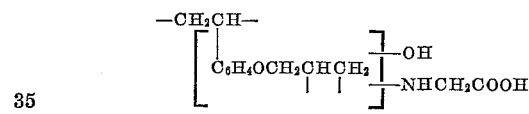

14. A polymer of claim 2 having at least 0.1 percent by weight of a polymerizable monomer having at least one $CH_2=CH<$ group copolymerized therein.

15. A polymer of claim 2 having at least 1 percent by weight of divinyl benzene copolymerized therein.

16. A process of claim 3 in which the amino-acid is iminodiacetic acid.

17. A process of claim 3 in which the aminoacid is isovaline.

18. A process of claim 3 in which the aminoacid is glycine.

19. A process of claim 3 in which the aminoacid is aspartic acid.

20. A process of claim 3 in which the aminoacid is alanine.

References Cited in the file of this patent

UNITED STATES PATENTS 2,850,481    D'Alelio _____ Sept. 2, 1958
2,860,160    Sundberg et al. _____ Nov. 11, 1958